United States Patent [19]

Krabbenhoft et al.

[11] Patent Number: 5,097,008

[45] Date of Patent: * Mar. 17, 1992

[54] PREPARATION OF BRANCHED POLYCARBONATE FROM OLIGOMERIC CYCLIC POLYCARBONATE AND POLYHYDRIC PHENOL

[75] Inventors: Herman O. Krabbenhoft, Schenectady; Eugene P. Boden, Scotia, both of N.Y.

[73] Assignee: General Electric Company, Schenectady, N.Y.

[*] Notice: The portion of the term of this patent subsequent to Jul. 18, 2006 has been disclaimed.

[21] Appl. No.: 521,495

[22] Filed: May 10, 1990

Related U.S. Application Data

[62] Division of Ser. No. 359,594, Jun. 1, 1990, abandoned.

[51] Int. Cl.$^5$ .............................................. C08G 64/30
[52] U.S. Cl. .................... 528/371; 525/463; 528/196; 528/204; 528/377; 528/378; 528/379
[58] Field of Search .............. 528/371, 370, 377, 378, 528/379, 196, 204

[56] References Cited

U.S. PATENT DOCUMENTS

| Re. 27,682 | 6/1973 | Schnell et al. | 260/47 |
|---|---|---|---|
| 3,541,049 | 11/1970 | Cleveland | 260/47 |
| 3,799,953 | 3/1974 | Freitag et al. | 260/395 |
| 4,185,009 | 1/1980 | Idel et al. | 260/45.9 |
| 4,415,722 | 11/1983 | Mark et al. | 528/196 |
| 4,426,513 | 1/1984 | Mark | 528/204 |
| 4,431,793 | 2/1984 | Rosenquist | 528/198 |
| 4,446,298 | 5/1984 | Mark et al. | 528/204 |
| 4,465,820 | 8/1984 | Miller et al. | 528/194 |
| 4,469,861 | 9/1984 | Mark et al. | 528/196 |
| 4,605,731 | 8/1986 | Evans et al. | 528/371 |
| 4,644,053 | 2/1987 | Brunelle et al. | 528/371 |
| 4,650,852 | 3/1987 | Evans et al. | 528/371 |
| 4,849,502 | 7/1989 | Evans et al. | 528/371 |
| 4,888,400 | 12/1989 | Boden et al. | 528/204 |

*Primary Examiner*—Harold D. Anderson
*Attorney, Agent, or Firm*—William H. Pittman; James C. Davis, Jr.

[57] ABSTRACT

Branched polycarbonates are prepared by melt equilibration of aromatic cyclic polycarbonate oligomers with a polyhydric phenol having more than two hydroxy groups per molecule, preferably 1,1,1-tris-(4-hydroxyphenyl)ethane, in the presence of a carbonate equilibration catalyst, preferably tetrabutylammonium tetraphenylborate. In an additional embodimetn of the invention, a linear aromatic polycarbonate is added to the reaction mixture. Branched polycarbonates prepared according to this inventin have high melt strength and high shear sensitivity characteristics and are useful in extrusion and injection molding processing applications and particularly useful in blow molding applications for preparing relatively large articles and panels.

8 Claims, No Drawings

PREPARATION OF BRANCHED POLYCARBONATE FROM OLIGOMERIC CYCLIC POLYCARBONATE AND POLYHYDRIC PHENOL

This application is a division of application Ser. No. 07/359,594, filed Jun. 1, 1990, now abandoned.

BACKGROUND OF THE INVENTION

This invention relates to branched polycarbonate compositions and a method of preparing them. More particularly, this invention relates to branched polycarbonate compositions having improved melt strength and a method of preparing them from aromatic cyclic polycarbonate oligomers in a melt equiliibration process.

Polycarbonate resins suitable for use in blow molding applications such as the production of hollow articles of large volume and large panels are required to have high melt strength (high shape retention) and high shear sensitivity characteristics such as a melt index ratio (MIR) greater than about 2.0 and a complex viscosity ratio ($R^*$) greater than about 3.0. In order to achieve such properties, polycarbonates with a critical degree of branching are required.

It is known that branched polycarbonates, for example, bisphenol-A ("BPA") polycarbonates, which exhibit high melt strength properties and are thus suitable for blowmolding applications, can be prepared in a heterogeneous interfacial polymerization process. The use of polyhydric phenols having three or more hydroxy groups per molecule, for example, 1,1,1-tris-(4-hydroxyphenyl)ethane (THPE), 1,3,5-tris-(4-hydroxyphenyl)benzene, 1,4-bis-[di-(4-hydroxyphenyl)phenylmethyl]benzene and the like, as branching agents for high melt strength blow-moldable polycarbonate resins prepared interfacially has been described in U.S. Pat. Nos. Re. 27,682 and 3,799,953.

Other methods known to prepare branched polycarbonates through heterogeneous interfacial polymerization methods include the use of cyanuric, chloride as a branching agent (U.S. Pat. No. 3,541,059); branched dihydric phenols as branching agents (U.S. Pat. No. 4,469,861); and 3,3-bis-(4-hydroxyaryl)-oxindoles as branching agents (U.S. Pat. No. 4,185,009). Additionally, aromatic polycarbonates end-capped with branched alkyl acyl halides and/or acids and said to have improved properties are described in U.S. Pat. No. 4,431,793.

Trimellitic triacid chloride has also been used as a branching agent in the interfacial preparation of branched polycarbonate. Reference is made, for example, to U.S. Pat. Nos. Re 27,682 and 3,799,953, referred to above. Although trimellitic triacid chloride works well as a branching agent, the aromatic ester linkages formed may lead to yellowing, presumably due to photo-Fries reactions. Since much of the branched polycarbonate produced is used in packaging applications and twin wall sheets wherein clarity and avoidance of yellowing are important, alternatives have been sought to prepare a branched polycarbonate containing only carbonate linkages.

The interfacial polymerization processes described above are typically conducted in a mixed aqueous-organic system which results in recovery of the polycarbonate in the organic phase. Usually a dihydric phenol is reacted with a carbonate precursor in the presence of a chain terminating or molecular weight controlling agent wherein the branching agent is employed as a comonomer in the preparation of a branched polycarbonate.

In the interfacial processes presently used to prepare branched polycarbonates, the branching agent is used in an amount sufficient to obtain the proper melt rheological properties, i.e., $R^*$ of 3.6–3.9, for current applications. Increasing the level of branching agent and decreasing the level of capping agent could lead to a resin with a higher $R^*$ value. However, this may also lead to higher solution viscosities, which would effectively restrict the final molecular weight and other properties of the branched polycarbonates, and create problems of handling the product solutions. Adjusting the branching and endcapping levels to suit individual needs may cause problems in cross contamination and require excessive purging between different grades. It is desirable, therefore, to provide a more efficient means for varying the branching and endcapping levels according to need.

Blow-moldable grade, branched polycarbonates possessing properties of high melt strength and the like prepared in such interfacial polymerization methods, however, are typically specialty products which require a plant to stop making conventional grades of linear polycarbonate, thus hindering plant flexibility and increasing production costs in their manufacture. It is therefore desirable to provide an alternative method for preparing branched polycarbonates having high melt strength and shear sensitivity properties which does not involve interfacial polycondensation methods.

It is further desirable to provide a method of preparing branched polycarbonates having enhanced melt properties which make the branched polycarbonates useful in preparing relatively large parts in blow molding applications.

SUMMARY OF THE INVENTION

It has been found that adjusting the branching level in an extrusion/finishing process is easier and more efficient and the use of cyclic polycarbonate oligomers leads to resins having higher $R^*$ values.

In accordance with the present invention, blow-moldable branched polycarbonates having the requisite physical properties of high melt strength and shear sensitivity and a novel and improved method for preparing them are provided.

The branched polycarbonate compositions of this invention are high molecular weight polymers having improved melt strength properties and comprising structural units of the formula

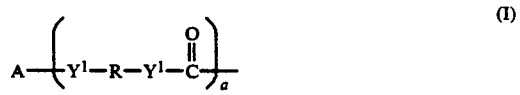

wherein a is a number in the range of about 20 to about 100, at least about 60% of the total number of R groups are aromatic organic radicals and the balance thereof are aliphatic, alicyclic, or aromatic radicals, each $Y^1$ is oxygen or sulfur, and A is hydrogen or an aromatic radical, with at least one A in the branched polycarbonate being hydrogen; and about 0.1 to about 2.0 mole percent, based on the moles of R, of structural units of the formula

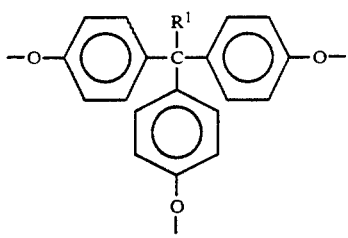

wherein $R^1$ is hydrogen, a lower alkyl group, an aromatic group or a group having the formula

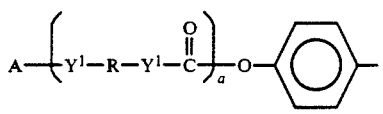

wherein a, R, $Y^1$, and A are as defined above; the branched polycarbonate composition comprising about 0.3 to about 6.0 mole percent of hydroxyl endgroups based on the moles of R, and having a melt index ratio of at least 2.0, a complex viscosity ratio of at least 3.0, a number average molecular weight in the range of about 5000 to about 40,000 as measured by gel permeation chromatography using polystyrene as the reference material, an intrinsic viscosity in the range of about 0.40 to about 0.60 as measured on solutions of 1.0, 0.5, and 0.33 percent in chloroform at 25° C., and a melt viscosity in the range of about 4000 to about 15,000 centiseconds at 300° C.

According to the method of this invention, the branched polycarbonates are prepared by contacting a mixture of aromatic cyclic polycarbonate oligomers with a polyhydric phenol having more than two hydroxy groups per molecule in the presence of a catalytic amount of a carbonate equilibration catalyst at a temperature in the range of about 200° C. to about 350° C.

In an additional embodiment, the branched polycarbonates are prepared by contacting the mixture of aromatic cyclic polycarbonate oligomers with a non-branched linear aromatic polycarbonate in the presence of the polyhydric phenol and the catalyst in the manner described above.

The branched polycarbonates obtained according to the invention preferably have melt rheological properties comprising a melt index ratio (MIR) of at least 2.0 and a complex viscosity ratio (R*) of at least 3.0. These branched polycarbonates can be used for both processing by extrusion and injection molding, and particularly for the manufacture of hollow articles and large panels by blow-molding processes which require materials possessing high melt strength and excellent shape retention of the extrudate.

DETAILED DESCRIPTION OF THE INVENTION

The branched polycarbonate compositions obtained according to the method of this invention contain, structural units of formula (I)

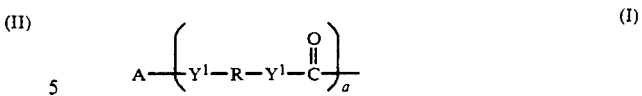

wherein a is a number in the range of about 20 to about 100. At least about 60% of the total number of R groups are aromatic organic radicals and the balance thereof are aliphatic, alicyclic, or aromatic radicals. Preferably, all R groups are aromatic. The aromatic R groups preferably have the formula $$-A^1-Y^2-A^2-$$

wherein each $A^1$ and $A^2$ is a monocyclic divalent aromatic radical and $Y^2$ is a bridging radical in which one or two carbon atoms separate $A^1$ and $A^2$. Such A groups frequently are derived from aromatic dihydroxy compounds of the formula $HO-A^1-Y^2-A^2-OH$. $A^1$ and $A^2$ generally represent unsubstituted phenylene and substituted derivatives thereof. The bridging radical $Y^2$ is most often a hydrocarbon group and, partricularly, a saturated group such as methylene, cyclohexylidene, and isopropylidene. Typical of some aromatic dihydroxy compounds which may be represented by R herein are described in U.S. Pat. No. 4,727,134, the entire disclosure of which is incorporated by reference herein. R is preferably a dihydric phenol, with the R group most often present in these oligomeric mixtures being the 2,2-bis(4-phenylene)propyl radical, which is derived from bisphenol A and preferred because of its availability and particular suitability for purposes of the present invention.

In Formula (I), $Y^1$ represents oxygen or sulfur. A is an endgroup which is either hydrogen or an aromatic radical. At least one endgroup represented by A is hydrogen in the branched polycarbonate of this invention. Preferably, all endgroups represented by A are hydrogen.

The branched polycarbonate composition of the present invention further comprises structural units represented by Formula (II)

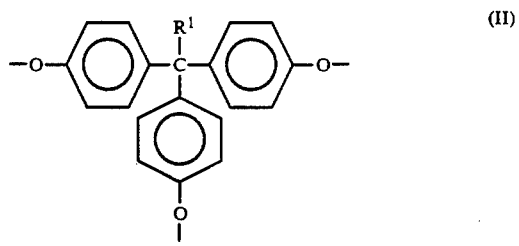

wherein $R^1$ is hydrogen, a lower alkyl group, an aromatic group, or a group having formula (III)

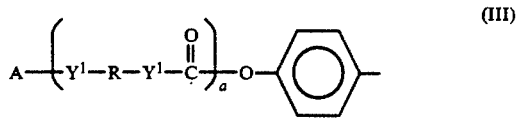

wherein a, R, $Y^1$, and A are as defined above. $R^1$ is preferably an alkyl group having 1 to about 8 carbon atoms, and most preferably is a methyl group. The structural units represented by formula (II) above are present in the branched polycarbonates of this invention in an amount ranging from about 0.1 to about 2.0, and preferably about 0.25 to about 1.0, mole percent, based on the moles of the group represented by R. The branched polycarbonate composition further contains about 0.3 to about 6.0, and preferably about 0.75 to about 3.0, mole percent, of hydroxyl endgroups, based on the moles of R.

The branched polycarbonates of this invention have a melt index ratio (MIR) of at least 2.0 and a complex viscosity value (R*) of at least 3.0. The complex viscosity value is defined as the ratio of the complex melt viscosity of a material at low shear (1 radian/sec) to that at high shear (as during extrusion, i.e. 100 radian/sec), typically 20,000 poise. R* is thus a measure of the shear thinning behavior of the polymer. Experience has taught that good blow molding performance is obtained when R* is equal to or greater than 3.5. R* values are obtained by determining the complex viscosity on a Rheometrics Dynamic Spectrometer at 3 different temperatures (typically 230, 250, and 270° C.). Using this data fitted to the Arrhenius equation, the optimum processing extrusion temperature is calculated, i.e., that temperature at which the melt viscosity is 20,000 poise at 100 radian/sec. Then, the viscosity at low shear is calculated at this temperature. R* is then calculated by dividing this viscosity by 20,000 poise. Melt index ratio is the ratio of melt flow rates at two different shear levels and is a measure of the non-Newtonian property of the polymer. Melt index ratio refers to the ratio of the number of grams multiplied by 4 of thermoplastic resin at 270° C. that can be forced through a 2.0 millimeter orifice in 15 seconds by a 21.5 kilogram force to the number of grams multiplied by 10 of resin that can be forced through in 1 minute by a 2.1 kilogram force. As indicated in the examples below, branched polycarbonates having a melt index ratio of at least about 2.5 and a complex viscosity ratio of at least about 5.0 can be obtained according to the method of this invention.

The branched polycarbonates provided in this invention have a number average molecular weight in the range of about 5000 to about 40,000 as measured by gel permeation chromatography using polystyrene as the reference material, an intrinsic viscosity preferably in the range of about 0.40 to about 0.60 as measured on solutions of 1.0, 0.5, and 0.33 percent in chloroform at 25° C., and a melt viscosity in the range of about 4000 to about 15,000 centiseconds at 300° C., as measured by the test procedures of U.S. Pat. No. 4,465,820 at column 4, lines 15-35, which is incorporated by reference herein.

The branched polycarbonates of this invention are prepared according to the method of this invention by contacting a mixture of aromatic cyclic polycarbonate oligomers with a polyhydric phenol having more than two hydroxy groups per molecule in the presence of a catalytic amount of a carbonate equilibration catalyst at a temperature in the range of about 200° C. to about 350° C.

Aromatic cyclic polycarbonate oligomers useful in the practice of the present invention are described in U.S. Pat. No. 4,644,053; 4,727,134; 4,605,731 and 4,650,852, each of which is incorporated by reference herein. The cyclic oligomers can be represented by the formula:

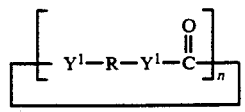

wherein n ranges from about 2 to 30, and R is as defined earlier herein.

The cyclic oligomers may contain organic carbonate, thiolcarbonate and dithiolcarbonate units.

The cyclic oligomer mixtures useful in this invention may be prepared by known procedures, such as that described in U.S. Pat. No. 4,727,134, the entire disclosure of which is incorporated by reference herein. For example, the cyclic oligomers may be formed by contacting a bishaloformate, such as a bisphenol bischloroformate, with an oleophilic aliphatic or heterocyclic tertiary amine, for example, triethylamine, and an aqueous alkali or alkaline earth metal hydroxide or carbonate solution. The reaction is carried out in a substantially non-polar organic, liquid such as methylene chloride or in a mixture of such organic liquid with water. The reaction temperature is generally in the range of about 0°-50° C.

Polyhydric phenols suitable as branching agents in the present invention include any aromatic trihydric or tetrahydric phenol or higher hydroxy substituted polyhydric phenol, for example, 1,1,1-tris-(4-hydroxyphenyl)ethane, (or 4,4', 4''-ethylidynetrisphenol or THPE); 1,3,5-tris-(2-hydroxyethyl)cyanuric acid (or 1,3,5-tris-(2-hydroxyethyl)-1,3,5-triazine-2,4,6-(1H, 3H, 5H)-trione); 4,6-dimethyl-2,4,6-tri-(4-hydroxyphenyl)-heptane; 2,2-bis[4,4'-(dihydroxyphenyl)cyclohexyl]-propane; 1,3,5-trihydroxybenzene (or phloroglucinol); 1,2,3-trihydroxybenzene (pyrogallol); and 1,4-bis-(4'4''-dihydroxy-triphenylmethyl)benzene. Such compounds and examples of additional polyhydric phenols suitable for use herein and their method of preparation are described, for example, in U.S. Pat. No. 3,799,953 and Re. 27,682.

Other commercially available polyhydric phenols useful herein include, for example, 2',3',4'-trihydroxyacetophenone; 2,3,4-trihydroxybenzoic acid; 2,3,4-trihydroxybenzoic acid trihydroxybenzophenone; 2,4,4'-trihydroxybenzophenone; 2', 4',6'-trihydroxy-3-(4-hydroxyphenyl)propiophenone; (or phloretin); pentahydroxyflavone; 3,4,5-trihydroxyphenylethlamine; 3,4,5-trihydroxyphenethyl alcohol; 2,4,5-trihydroxypyrimidine (isobarbituric acid); tetrahydroxy-1, 4-quinone hydrate (tetrahydroxy-1,4-benzoquinone); 2,2',4,4'-tetrahydroxybenzophenone; and 1,2,5,8-tetrahydroxyanthraquinone.

Of course, a mixture of two or more of such polyphydric phenols may be employed to achieve particularly desired properties of branched polycarbonate.

While other polyhydroxy phenols suitable for the practice of the present invention will occur to those skilled in the art, 1,1,1-tris-(4-dihydroxyphenyl)ethane, also referred to herein as THPE, is preferred because it is readily available at competitive cost.

The term "catalysts" as used herein includes compounds which function as conventional catalysts and compounds which undergo chemical changes and function as conventional initiators or promoters.

Suitable carbonate equilibration catalysts include various bases and Lewis acids, and in general, any of those catalysts known for effecting polymerization of cyclic polycarbonate oligomers such as described in U.S. Pat. Nos. 4,650,852 and 4,605,731, which are incorporated by reference herein.

Illustrative examples of bases include lithium 2,2,2-trifluoroethoxide, n-butyllithium, tetramethylammonium hydroxide, and various weakly basic salts such as sodium benzoate and lithium stearate.

Examples of useful Lewis acids include dioctyltin oxide, triethanolamine titanium isopropoxide, tetra(2-ethylhexyl)titanate and polyvalent metal chelates such as aluminum acetylacetonate, bisisopropoxy titanium bisacetylacetonate, and the bisisopropoxy aluminum salt of ethyl acetoacetate.

Particularly useful as carbonate equilibration catalysts herein are coordination compounds such as those described in above mentioned U.S. Pat. Nos. 4,650,852 and 4,605,731 and employed therein as polycarbonate formation catalysts. Such a class of basic catalyst compounds is preferred in the practice of the present invention as they are able to generate phenoxides upon contact with the polyhydric phenol branching agents thus providing strong nucleophiles which can readily undergo an addition reaction with the substrate electrophillic carbon atoms in the manner discussed previously.

Illustrative examples of such preferred catalysts include tetrabutylammonium tetraphenylborate, tetramethylammonium tetraphenylborate, lithium tetraphenylborate, sodium tetraphenylborate, sodium bis-2,2'-biphenyleneborate, potassium tetraphenylborate, tetramethylphosphonium tetraphenylborate, tetra-n-butyl-phosphonium tetraphenylborate and tetraphenylphosphonium tetraphenylborate.

The choice of any particular catalyst selected is not critical to the practice of this invention. Thus the use herein of such catalyst described above or similar catalysts may depend upon such factors as their thermal stability, the desired rate of reaction and the chemical nature of the particular polycarbonate and branching agents employed. Tetrabutylammonium tetraphenylborate, however, is particularly preferred because of its high activity.

In this invention, the branched polycarbonates are prepared in a melt equilibration process. The branched polycarbonates may be prepared by dry mixing the above-described reagents prior to their reaction, for example, by melt condensation in a Helicone mixer for approximately 5 to 30 minutes, or by dry mixing the reagents and continuously feeding the mixture through an extrusion device. Equilibration is generally carried out at temperatures ranging from about 200° C. to about 350° C. and preferably about 250° C. to about 325° C. Prior to polymerization, the reagents may also be dissolved in a suitably inert solvent, for example, methylene chloride and the like, and the solvent thereafter evaporated.

In general, equilibration is permitted to proceed for a period of time sufficient to achieve the desired melt properties in the branched resin product.

Varying the level of polyhydric branching agent will effect the number of branching sites and the average branched polycarbonate chain length. For example, low levels of branching agents will produce few branching points with relatively long chains, and higher levels will increase the number of branching points, but will decrease the average length of the chains. The amount of branching agent, therefore, will depend upon the various properties of particular branched polycarbonates desired and end uses contemplated. In the preparation of blow-moldable polycarbonate resins, however, it is preferred to use levels of branching agent ranging from about 0.1 to about 2.0 mole percent and most preferably about 0.25 to about 1.0, based on repeat units in the oligomer mixture.

The carbonate equilibration catalyst is present in a "catalytic amount" which is that amount sufficient to promote equilibration.

The amount of the catalyst may depend upon the particular catalyst employed, the reaction rate desired, e.g. the rate at which the branching reaction reaches equilibrium and a stable branched polycarbonate product is obtained, the chemical nature of the particular substrate and branching agent employed, and the particular properties of various branched polycarbonates desired and end uses contemplated. Depending on such variables, an effective amount of catalyst for the preparation of a particular branched polycarbonate can easily be determined without undue experimentation. It is thus preferred that when borate-containing initiators are employed in the preparation of blow-moldable, high melt strength branched chain polycarbonates, the amounts thereof should range from about 0.0125 to about 0.2 mole percent, and preferably about 0.025 to about 0.1 mole percent, based upon the number of repeat units in the oligomer mixture.

Without intending to limit the scope of the present invention to any theory or reaction mechanism, it is believed that the reaction is initiated by the formation in situ of a reactive phenoxide from reaction of the equilibration catalyst with the polyhydric branching agent which can thereafter readily undergo an additional reaction with electrophilic carbonate carbon atoms on the cyclic oligomer backbone resulting in chain scission which causes the cyclic oligomers to polymerize to high molecular weight branched polymers. It is further believed that the reaction continues until equilibration is attained.

In an additional embodiment of the present invention, the branched polycarbonates are prepared by contacting the mixture of aromatic cyclic polycarbonate oligomers with a non-branched linear aromatic polycarbonate in the presence of the polyhydric phenol branching agent and the catalyst in the manner described hereinabove. In using linear polycarbonates in admixture with the cyclic oligomer mixture herein, it is believed, without intending to limit the scope of this invention in any way, that the linear polycarbonates provide an additional substrate for attack by reactive phenoxide ions formed in situ through the reaction of the polyhydric phenol branching agents and equilibration catalysts. The thus formed phenoxide ions can thereafter readily undergo an addition reaction with electrophilic carbonate carbon atoms on the substrate linear polycarbonate backbone causing chain scission to form a lower molecular weight fragment and a branched aromatic polycarbonate in the manner described in copending commonly owned application, Serial No. 297,380, filed Jan. 17, 1989, which is incorporated herein by reference. The reaction can thereafter continue when the reactive moieties on the thus formed aromatic polycarbonate attack electrophilic carbon atoms on the linear polycarbonate or cyclic oligomer backbones. Chain scission will not only result in a reduction in chain length of the high molecular weight linear polycarbonate, but also in the polymerization of the cyclic oligomers to high molecular weight polymers. The ability of the cyclic oligomers to produce a high molecular weight polymer enables the branches to be longer than those formed by cleavage of the linear polycarbonate. Since an increase in the length of the branched chains of the polycarbonate results in an increase in the polymer's melt strength, branched polycarbonates prepared from a combination of cyclic and linear polycarbonates have better melt strength properties than branched polycarbonates prepared from linear polycarbonate alone.

Unbranched linear polycarbonates useful in this invention include any of the several aromatic polycarbonates which can be obtained commercially, or prepared by any of the usual procedures, for example, by reacting a dihydroxy aromatic compound with phosgene in an interfacial polymerization process.

Generally, the linear polycarbonates useful in this invention have a number average molecular weight of about 6,000 to about 50,000. The ratio of cyclic polycarbonate to linear polycarbonate to be used in this embodiment will depend on the MIR and R* values desired. Higher R* values are obtained by increasing the cyclic to linear ratio, as may be seen in examples 32-38 below.

In the method of this invention, additives of all kinds may be added at any stage before, during or after the preparation of the branched aromatic polycarbonates. Examples which may be mentioned in this context include flame retardants, dyestuffs, pigments, mold release agents, stabilizers against the action of moisture, heat and ultraviolet radiation, lubricants and fillers.

The following detailed examples will serve to mor fully illustrate the practice of preferred embodiments of the present invention. Such examples are intended to be for illustrative purposes only, and are not intended to limit the scope of this invention.

EXAMPLE 1

The following example illustrates the formulation, polymerization, and isolation of branched polycarbonates from aromatic cyclic polycarbonate oligomers and [1,1,1-tris-(4-hydroxphenyl)ethane, hereinafter referred to "THPE". Tetrabutylammonium tetraphenylborate is referred to hereinafter as "borate".

In a 100 mL round bottomed flask are placed 5 ml of an acetone solution containing $3.933 \times 10^{-4}$ mole THPE, 50 mL of an methylene chloride solution containing $3.933 \times 10^{-2}$ mole of cyclic oligomeric carbonate (previously precipitated from $CH_3OH$) and 2.0 ml of a methylene chloride solution containing $7.866 \times 10^{-6}$ mole of borate. The resulting solution was concentrated to dryness on a rotary evaporator (approximately 27 in Hg, approximately 60° C. water bath). Prior to polymerization, the flask was subjected to a temperature of about 110° C. and a pressure of about 27 inches Hg for 1.5 hours.

The mixture was polymerized by immersing the flask (while under vacuum) into a salt bath maintained at 280° C. After 2 minutes, the vacuum was replaced with nitrogen. After 15 minutes, the flask was removed from the salt bath and allowed to cool to room temperature. Approximately 100 mL methylene chloride was added to dissolve the product.

The polymer product was isolated by filtering the solution through filter paper and precipitating with 600 mL of methanol in a Waring Blender (30%). The supernatant solution was decanted and 300 mL of methanol added. The blender was stirred at 100% for 5 minutes. The polycarbonate was isolated by filtration and dried overnight at about 27 inches Hg and about 100° C. to give 9.29g (93% yield).

EXAMPLE 2-36

In Examples 2-36 branched polycarbonates were prepared by combining cyclic oligomers (previously precipitated by adding a methylene chloride solution to methanol in a Waring Blender), borate, and THPE in methylene chloride. The amounts of THPE and borate were varied as indicated in the tables below. The mixtures were concentrated to dryness on a rotary evaporator, vacuum dried at approximately 120° C. and 27 inches Hg, and heated under nitrogen at approximately 275° C. for up to 30 minutes. The polymer was isolated by dissolving the reaction mixture in methylene chloride and precipitating the polymer with methanol.

The dried polymer was then evaluated for MIR and/or R*. Pertinent results are summarized in the tables below.

In Examples 2-15, the mole % of THPE is varied as indicated in Tables 1 and 2, and the amount of borate is maintained at a constant value of 0.025 mole %. In these examples, the effect of THPE incorporation on the MIR of the branched polycarbonate was measured.

TABLE 1

| Effect of THPE Incorporation on MIR of Polycarbonate[a] | | | | | | |
|---|---|---|---|---|---|---|
| Example No. | Mole % THPE | Reaction Temp. (C.) | % Yield Polycarb. | $M_w$ | $M_w/M_n$ | MIR |
| 2 | 0.00 | 272 | 90 | 103,200 | 1.66 | 1.6 |
| 3 | 1.00 | 276 | 93 | 80,600 | 2.48 | 3.4 |
| 4 | 1.00 | 274 | 95 | 78,800 | 2.73 | 3.4 |
| 5 | 0.00 | 278 | 88 | | | 1.6 |
| 6 | 1.00 | 281 | 91 | | | 3.1 |
| 7 | 1.00 | 279 | 91 | | | 3.1 |

[a]All reactions contained 0.025 mole % borate and were carried out for 30 min.
[b]Determined as described in U.S. 4,415,722, col. 6, lines 1-7.

TABLE 2

| Effect of THPE Level on MIR and R* of Polycarbonate[a] | | | |
|---|---|---|---|
| Example No. | Mole % THPE | MIR | R* |
| 8 | 0.3 | 2.5 | — |
| 9 | 0.5 | 3.0 | 5.0 |
| 10 | 0.7 | 3.6 | 5.0 |
| 11 | 0.7 | 3.25 | 5.5 |
| 12 | 0.9 | 3.40 | — |
| 13 | 1.0 | 3.49 | 8.0 |
| 14 | 1.1 | 3.29 | — |
| 15 | 1.5 | 4.48 | 10.0 |

[a]All reactions contained 0.025 mole % borate and were carrried out at 275° for 30 minutes.

As indicated by the data in TABLES 1 and 2, incorporation of relatively low levels of THPE in the branched polycarbonates prepared according to the present invention results in MIR values of at least about 2.5 and R* values of at least about 5.0.

In comparison, the MIR and R* values determined for conventionally prepared branched polycarbonates, i.e. Lexan ® 150 obtained from the General Electric Company, which are based on trimellitic triacid chloride, average about 2.45 and 4.0, respectively.

EXAMPLES 16-31

The effect of borate level on the MIR of the branched polycarbonate were determined in Examples 16-31, the results of which are presented in Table 3.

TABLE 3
Effect of Borate Level of MIR of Polycarbonate

| Example No. | Mole % borate | Mole % THPE | Reaction Temp (°C.) | MIR |
|---|---|---|---|---|
| 16 | 0.000 | 0.70 | 270° | No polymer formed |
| 17 | 0.025 | 0.70 | 270° | 4.5 |
| 18 | 0.050 | 0.70 | 270° | 5.2 |
| 19 | 0.075 | 0.70 | 270° | 3.1 |
| 20 | 0.100 | 0.70 | 270° | 2.7 |
| 21 | 0.025 | 1.00 | 281° | 3.1 |
| 22 | 0.025 | 1.00 | 279° | 3.1 |
| 23 | 0.075 | 1.00 | 279° | 2.3 |
| 24 | 0.020 | 0.00 | 280° | 1.71 |
| 25 | 0.020 | 0.50 | 280° | 3.65 |
| 26 | 0.020 | 1.00 | 280° | 3.85 |
| 27 | 0.020 | 2.00 | 280° | 2.93 |
| 28 | 0.040 | 0.00 | 280° | 1.65 |
| 29 | 0.040 | 0.50 | 280° | 4.04 |
| 30 | 0.040 | 1.00 | 280° | 3.70 |
| 31 | 0.040 | 2.00 | 280° | 3.03 |

Inspection of Table 3 reveals that branched polycarbonates with MIR values greater than approximately 2.5 can be achieved with varying amounts of borate. In general, the lower the amount of borate within the range of 0.02-0.10 mole %, the higher is the MIR.

With regard to THPE levels, the optimum level appears to be between 0.5 and 1.0 mole %.

EXAMPLES 32-36 AND COMPARATIVE EXAMPLES 37 AND 38

The following examples illustrate the preparation of branched polycarbonates from cyclic bisphenol A polycarbonate oligomers and linear bisphenol A polycarbonate, Lexan® 130, obtained from the General Electric Company. 508 grams of polycarbonate were dry mixed with a fixed amount of borate (0.025 mole %). Varying the ratio of linear polycarbonate and cyclic polycarbonate to total 508 grams each time, a series of Helicone/polymerizations were performed as described below at 270-300° C.

The oil temperature on a five-pint capacity Helicone Vertical Mixer (Atlantic Richfield Model ACV) was set at 600° F. Linear bisphenol A polycarbonate, available from General Electric Company, and cyclic polycarbonate (total amount of linear and cyclic polycarbonates being 508 g), 0.281 g (0.025 mole %) of borate, and 6.12 g (1.0 mole %) of THPE were added to a 1 gallon plastic container. The contents were shaken and the entire mixture was added to the helicone over 3-5 minutes with occasional stirring. Within 10 minutes after the addition began, the material was completely molten and was stirred under a nitrogen atmosphere for an additional 15 minutes. When the material was discharged from the helicone, samples were taken and stretched into long strands for MIR samples. Hot samples were also forced into disk molds and compression molded at 435° F. for R* determinations.

A Tinius Olsen melt indexer was used to obtain the MIR values. The only deviations from standard MIR procedures were 1) extrusion of the material at 270° C. instead of at 300° C. and 2) use of 21.5 Kg and 2.1 Kg weights instead of 21.6 Kg and 2.16 Kg weights.

The cyclics used in these examples were purified as follows. Solvent precipitated cyclics were prepared by dissolving 300 g of crude cyclics with 750 mL of methylene chloride followed by addition of this solution to 3.0 L of vigorously stirred methanol in a large blender. Methanol slurried cyclics were prepared by slurrying 1000g of cyclics and 4.0L of methanol in a large blender for 15 minutes followed by filtration. Crude cyclics were used and in all cases, the polymer present in the preparation of cyclics was not removed. Comparative Examples 37 and 38 were carried out to illustrate similar properties of commercially available branched and linear polycarbonate, respectively, such that the desirable properties of the branched polycarbonates prepared in accordance with the present invention ar fully demonstrated and appreciated. For a comparison of melt viscosities, the weight of sample extruded when a 2 Kg weight is used to extrude the polycarbonate from the melt indexer for 60 seconds is recorded for each sample.

The results of Examples 32-36 and Comparative Examples 37 and 38 are summarized in Table 4.

TABLE 4
Equilibration/Polmerization of Linear Polycarbonate and Cyclics with THPE

| # | % Lexan ® 130/% Cyclics | MIR | 2 Kg wt | R* ($T_{ref}$) |
|---|---|---|---|---|
| 32 | 100/0.0 | 2.59 | 0.341 g | 4.5 (250° C.) |
| 33 | 75/25 | 2.54 | 0.236 g | 5.2 (252° C.) |
| 34 | 50/50 | 2.53 | 0.244 g | 5.7 (267° C.) |
| 35 | 25/75 | 2.73 | 0.227 g | 6.1 (267° C.) |
| 36 | 0.0/100 | 2.46 | 0.220 g | 6.3 (267° C.) |
| 37 | Lexan° 150 | 2.39 | 0.140 g | 3.8 (278° C.) |
| 38 | Lexan° 130 | 1.35 | 0.381 g | 1.5 |

Although the MIR values do not indicate any major differences as cyclics are doped into the linear polycarbonates, the 2 Kg samples indicate an increase in viscosity, and the R* values indicate a dramatic rise in the melt strength of the product.

EXAMPLES 39 -41

Cyclics used in Examples 32-38 were dissolved in methylene chloride and precipitated into methanol to remove low molecular weight linear oligomers which are present in the cyclics. Removal of low molecular weight oligomers increases the ultimate molecular weight achievable when cyclics polymerize, and thus, increase the chain length of the branches in this process. In order to determine how important purification of the cyclics is, three different types of cyclics were used at a 50/50 ratio of Lexan® 130 linear polycarbonate to cyclic polycarbonates, loading with 1.0 mole % THPE and 0.025 mole % borate. Cyclics which had been dissolved in methylene chloride and precipitated into methanol (methanol precipitated) were compared with cyclics which had been slurried in methanol (methanol slurried) and cyclics which were not treated at all (crude cyclics). The results are listed in Table 5.

TABLE 5
Effects of Cyclics Purity on Melt Properties

| # | MIR | 2 Kg wt | R* ($T_{ref}$) | Purification |
|---|---|---|---|---|
| 39 | 2.53 | 0.244 | 5.7 (267° C.) | Methanol precipitated |
| 40 | 2.63 | 0.277 | 5.2 (262° C.) | Methanol slurried |
| 41 | 2.39 | 0.346 | 4.7 (255° C.) | Crude cyclics |

These results clearly indicate that the purity of the cyclics is a concern when trying to raise the melt strength properties of the polymer. Purer cyclics should lead to materials with higher R* values at lower loadings of cyclics.

What is claimed is:

1. A method for preparing a branched polycarbonate composition which comprises contacting a mixture of aromatic cyclic polycarbonate oligomers with a polyhydric phenol having more than two hydroxy groups per molecule in the presence of a catalytic amount of a carbonate equilibration catalyst at a temperature in the range of about 200° C. to about 350° C. in a melt equilibration process.

2. A method according to claim 1 wherein the cyclic polycarbonate oligomers have the formula

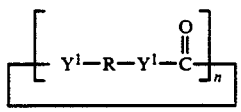

wherein n ranges from about 2 to about 30, at least about 60% of the total number of R groups are aromatic organic radicals and the balance thereof are aliphatic, alicyclic, or aromatic radicals, and each $Y^1$ is oxygen or sulfur.

3. A method according to claim 2, wherein each R group has the formula:

$$-A^1-Y^2A^2-$$

wherein each of $A^1$ and $A^2$ is a monocyclic divalent aromatic radical and $Y^2$ is a bridging radical in which one or two carbon atoms separate $A^1$ and $A^2$.

4. A method according to claim 3, wherein R is a 2,2-bis(4-phenylene)propyl radical.

5. A method according to claim 1 wherein the polyhydric phenol is a trihydric phenol or a tetrahydric phenol.

6. A method according to claim 5 wherein the polyhydric phenol is 1,1,1-tris-(4-hydroxyphenyl)ethane.

7. A method according to claim 1 wherein the carbonate equilibration catalyst is selected from the group consisting of tetrabutylammonium tetraphenylborate, tetramethylammonium tetraphenylborate, lithium tetraphenylborate, sodium tetraphenylborate, sodium bis-(2,2'-biphenylene)borate, potassium tetraphenylborate, tetramethylphosphonium tetraphenylborate, tetra-n-butylphosphonium tetraphenylborate and tetraphenylphosphonium tetraphenylborate.

8. A method according to claim 7 wherein the carbonate equilibration catalyst is tetrabutylammonium tetraphenylborate.

* * * * *